United States Patent
Delevallee

(10) Patent No.: US 6,657,337 B1
(45) Date of Patent: Dec. 2, 2003

(54) DIRECT CURRENT ELECTRIC MOTORS, IN PARTICULAR FOR MOTOR VEHICLE ACTUATORS

(75) Inventor: Jean-Louis Delevallee, Oyre (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/890,734
(22) PCT Filed: Feb. 4, 2000
(86) PCT No.: PCT/FR00/00269
§ 371 (c)(1), (2), (4) Date: Aug. 2, 2001
(87) PCT Pub. No.: WO00/46901
PCT Pub. Date: Aug. 10, 2000

(30) Foreign Application Priority Data

Feb. 5, 1999 (FR) .............................. 99 01358

(51) Int. Cl.$^7$ ............................ H02K 5/04; H02K 9/22
(52) U.S. Cl. ................... 310/89; 310/154.01; 310/254
(58) Field of Search .................... 310/154, 89, 127, 310/128, 136, 143, 148, 90, 261, 264, 254

(56) References Cited

U.S. PATENT DOCUMENTS

| | | | | |
|---|---|---|---|---|
| 1,485,533 A | * | 3/1924 | Sammarone ................ 310/217 |
| 1,999,303 A | * | 4/1935 | Sarbey .................... 192/110 B |
| 2,348,053 A | * | 5/1944 | Bowker ..................... 180/65.5 |
| 2,598,623 A | * | 5/1952 | Vacha .......................... 310/90 |
| 3,610,975 A | * | 10/1971 | Onjanow ..................... 310/57 |
| 3,624,434 A | * | 11/1971 | Dafler et al. ................ 310/239 |
| 3,701,911 A | * | 10/1972 | Stig .......................... 310/60 R |
| 5,514,922 A | | 5/1996 | Yabushita et al. ............ 310/45 |
| 5,757,095 A | | 5/1998 | Ohmi et al. .................. 310/58 |

FOREIGN PATENT DOCUMENTS

| | | |
|---|---|---|
| DE | 2 237 603 | 2/1974 |
| EP | 0 831 012 | 3/1999 |
| FR | 2 432 790 | 2/1980 |

* cited by examiner

*Primary Examiner*—Burton Mullins
(74) *Attorney, Agent, or Firm*—J. Gordon Lewis

(57) ABSTRACT

An electric motor for motor vehicle actuators include a rotor provided with a coil having first and second radial ends and rotatingly mounted in a hollow frame of two parts directly mounted on each other and having end walls, the two parts are made of good heat conducting material. The frame bears an inductor. The frame is sealed, and the two parts are two components transversely assembled one on the other, and the end wall of each part is continuously adjacent to one of the first and second ends of the coil.

26 Claims, 2 Drawing Sheets

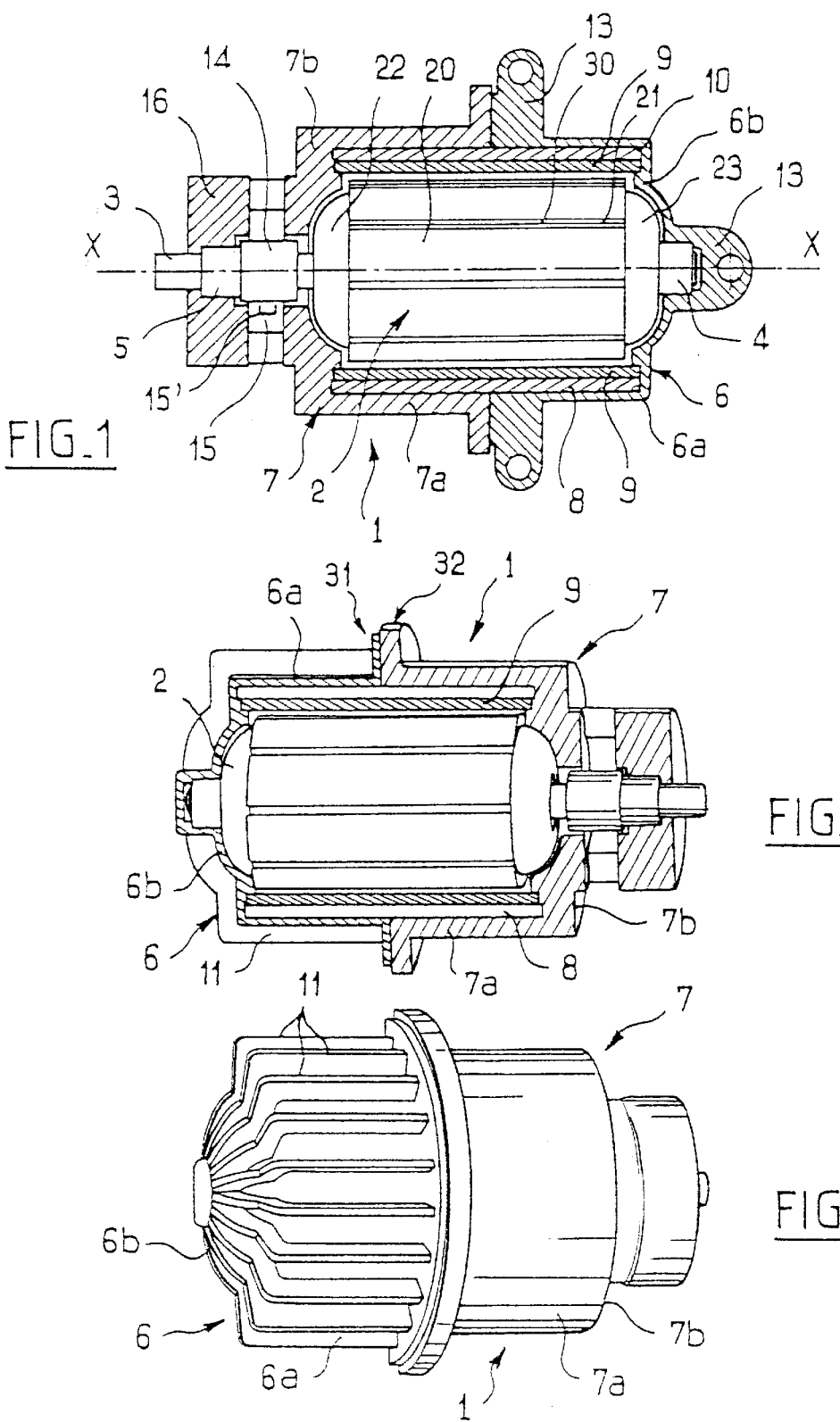

DIRECT CURRENT ELECTRIC MOTORS, IN PARTICULAR FOR MOTOR VEHICLE ACTUATORS

BACKGROUND

The present invention concerns electric motors used with a motor vehicle actuator.

The invention advantageously finds use in closed electric motors that dissipate heat energy, such as wiper motors, clutch controls, the windshield motors of motor vehicles, and electric control motors of sunroofs or of seats. The invention applies to electric motors of the synchronous type, asynchronous types, or others.

Classically, the stator of an electric motor with direct current comprises a steel frame which serves to support the magnets, which assures the seal of the motor, allowing one to close the magnetic flux and assures a good removal of the heat generated in the inductor via conduction, convection and radiation.

In certain applications, it is desirable to have at one's disposal very small electric motors, allowing higher rotational speeds and transmitting significant engine torque, for the wiping and the control of the wiping of a vehicle.

In order to do this, one knows, in document FR-2.432.790, electric motor structures in which the frame of the stator is in a non-magnetizable material, such as "zamac", and carries a soft-iron ring-shaped element that allows the flux of the magnetic field to close.

This frame is made of up two half boxes closed onto each other according to a contact plane what passes by the axis of the motor. These half boxes present openings in which the stator magnets are received, such that the said frame is not at all sealed and the motor is well ventilated.

A technical problem encountered while one seeks to create compact and water- and dust-proof electric motors is that of the evacuation of the heat dissipated by the inductor because, while one tries to diminish the size of the motor, one must increase the rotational speed in order to transmit an equivalent engine torque, while leads to an increase of the heat to emit.

SUMMARY

The goal of the invention is to resolve this problem in a simple and economic manner by improving the thermal exchanges.

The invention proposes such an electric motor, to be used in a motor vehicle, that comprises a rotor provided with a coil having first and second radial ends, and mounted rotatingly in a hollow frame formed of two hollow parts directly mounted on each other and having end walls. The two parts are made of good heat conducting material, and the frame bears induction means. The frame is sealed, and the two parts are two pieces assembled transversally one onto the other. The end wall of each part is continuously adjacent to one of the first and second ends of the coil.

In these conditions, the radiation and thermal convection of the ends of the coil are directly transmitted to the end walls and evacuated in the optimal method.

In addition, the plane of the joint or the assembly of the two pieces is implanted outside of the bearings supporting the motor axis in such a way that the bearings are carefully arranged. Also, the two pieces are not necessarily the same, for example, one of the pieces can have a thickness considerably greater than the other. However, the assembly plane of the two pieces can be a simple sturdier flange.

Thanks to transversal mounting of the pieces of the frame, direct access to the parts making up the motor is facilitated by removing one of the pieces of the frame.

Such a motor is advantageously completed by the different following characteristics taken individually or according to all of their possible combinations:

- the walls of the end envelope roughly in the shape of buns, made up from the ends of the coil, in order to still prefer the thermal exchanges;
- the interior surfaces of the end walls of the two pieces of the frame are centrally shaped with a bowl shape that limits the ends of the rotor coil that are adjacent to the walls;
- the heat conducting material is not magnetic and is advantageously chosen from the group containing "zamac," aluminum, and magnesium in order to reduce the weight of the motor and to facilitate its creation via casting;
- variably, the material is magnetic or magnetizable, such as steel;
- one of the two pieces of the frame is a piece with at least one part gear box casing of the actuator to which the said motor corresponds;
- at least one of the two pieces of the frame comprises an end of the wall and a radial orientation portion that contains, on the outside, elements that contribute to the increase in thermal changes with ambient air;
- at least one of the two pieces of the frame comprises cooling fins;
- at least one of the two pieces of the frame comprises fixation lugs that facilitate the thermal changes via conduction and the dismantling of the piece devoid of the fixation lugs;
- at least one or the other of the two pieces of the frame comprises a wall end and circumferential part; and
- the two pieces are in different materials.

BRIEF DESCRIPTION OF THE DRAWING

Other characteristics and advantages of the invention will be brought out in the following description. This description is purely illustrative and non-limiting. It must be read in regard to the attached drawings on which:

FIG. 1 is a schematic cut view illustrating one method of production;

FIG. 2 is a schematic cut view illustrating another method of production;

FIG. 3 is a perspective view of the production method of FIG. 2;

DETAILED DESCRIPTION

Figure 4:
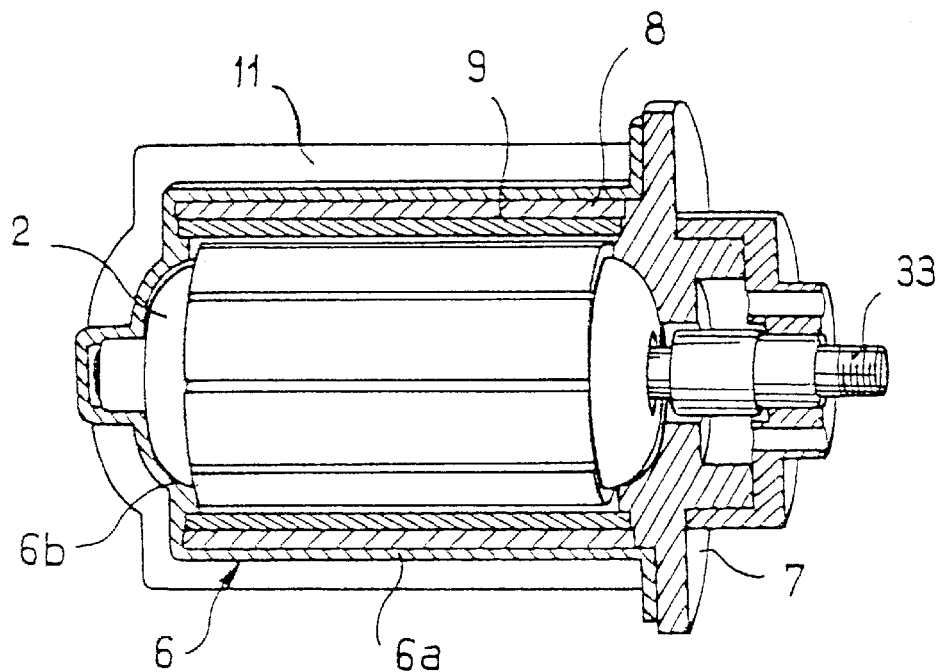
FIG. 4 is schematic cut view illustrating another method of production of invention.

The electric motor that is represented in FIG. 1 is a closed direct current electric motor, that comprises a hollow frame 1, as well as a coiled rotor 2 carried by a shaft 3 mounting rotating between two bearings 4, 5 mounted in the frame 1, made up of ball bearings in this method of production. The shaft 3 carries between these two bearings 4, 5 a packet of coupled sheet metal 20, each having notches in the shape of a V in order to make up radial grooves 30. These grooves are designed to wrap around several conductor threads, here in copper, in order to form a coil 21. This coil thus has, projecting in relation to the packet 20, and at each of its ends, a first and second radial end, 22 and 23, in the shape of buns.

The frame 1 is a closed frame that is watertight and sealed to dust. It is made up of two pieces 6, 7 that are radially arranged one on the other, their contact and assembly plane being notably perpendicular to the axis of rotation X—X of the shaft 3.

These two pieces 6, 7 are hollow molded pieces in a light non-magnetic material in this method of production, and have good thermal conduction, such as aluminum, magnesium, "zamac", etc. Variably, these hollow pieces 6,7 are made of machined steel or another magnetic material or magnetizable material and a good heat conductor.

The two pieces 6,7 each have a ring-shaped portion 6a, 7a with radial orientation, the interior surface of which is of a cylindrical shape, and a bottom portion 6b, 7b, with transversal orientation, that ends the portion 6a, 7a at an end. The bottom 6b receives the bearing 4 that makes the rear bearing; and the bottom 7b is crossed by the shaft 3 and is prolonged by an overhang 16 that receives the front bearing 5, as well as the manifold 14 of the motor. It also has lodgings 15 for charcoal 15'.

The frame 1 carries a ring inductor 8 and magnets 9. In order to do this, the frame receives in its interior a tubular ring, or tube, 8 in a magnetic or magnetizable material, for example, soft iron.

The frame 1 also receives permanent magnets 9 that are placed on the interior of the tube 8 and the magnetic field of which surrounds the tube 8. A weak air-gap is placed between the packet of steel 20 and the magnets 9, allowing the increase of the motor's performance.

The tube 8 and the magnets 9 are held in place via a built-in in the frame 1 by interior holes 10 that have bottoms 6b, 7b and in which the edges of the tube 8 and the magnets 9 are received. This built-in allows, via cooperation, the shapes to free themselves from springs normally used for assembling the bearings of the tube. In addition, the replacement of these springs by the heat conducting material between the holes 10 allows the more efficient removal of heat because the coil of the conductor thread in the grooves 30 are adjacent to this material that advantageously reaches radially from one bottom 6b to the other 7b.

The bottoms 6b, 7b, each transversally making up an end wall for the piece 6, 7, respectively, also having an interior with a bowl shape that envelopes the radial ends 22, 23 of the coil 21 of the rotor 2. These ends 22, 23 are according to the invention, continually adjacent to the bottoms 6b, 7b, which allows the minimization of the space between these bottoms 6b, 7b and the ends 22, 23. As a consequence, the radiation energy by the ends 22, 23 is transmitted over the entire frame and removed in an optimized manner.

As one already knows, the structure that was just described allows the use of good heat conducting materials in order to create a sealed frame, specifically to water and dust, of a compact electric motor.

In addition, the bottoms 6b, 7b of the frame, making up end walls, have centrally the shape of a bowl in order to receive in a complementary manner the buns 22, 23 of the coil 21. This arrangement minimizes the distance between the coil and the frame 1, which allows the optimization of the cooling of the inductor by the frame 1.

One will also note that "zamac", aluminum, or magnesium allows a gain of mass.

In addition, the structure described allows the casting of one of the two pieces 6, 7, that make up the frame 1—and specifically that which defines the front bearing of the motor—in such a way that it is a piece with at least one gear box casing part, the overhang 16, of the actuator to which the motor is associated. Also, the piece that is cast in one piece with at least one gearbox casing part can be in a different material, with a similar magnetic nature or different in relation to the other piece.

The result is a simplification of mounting, as well as an increase in volume of the frame 1 which contributes to the increase the thermal changes with the ambient air.

In the example illustrated in FIG. 1, the piece 6 has more than one fixation lug 13 that, other that their mechanical function, also allows the augmentation of the volume of the frame 1 and thus the thermal changes via convection and radiation with the ambient air and via conduction with the support on which the lugs 13 are attached. In addition, the fact that the fixation lugs 13 are placed to the right of the steel packet 20 allows the diminishing the chance of being unbalanced and thus to improve the holding of the rotor 2.

Variably or as a complement, it can also be planned that at least one of the two pieces 6 and 7 carry cooling fins.

This is what is illustrated in FIGS. 2 and 3, on which one has represented a production variance in which the circumferential part 6a of the piece 6 comprises more than one cooling fin 11 that reaches the length of the generators of this part 6a, each in a plane diametrical to the piece 6. More specifically on FIG. 2, it appears that pieces 6 and 7 are joined via flanges 31, 32 of which one 32 is interrupted by the fixation lugs 13. The flanges are assembled together via fixation systems, such as screws, rivets or others known to those in this profession.

Other production variations of the invention are also very possible. For example, the two pieces 6, 7 of the frame 1 can carry fixation lugs and cooling fins. Each piece can contain at least one fixation lug interrupting the corresponding flange.

Figure 5:
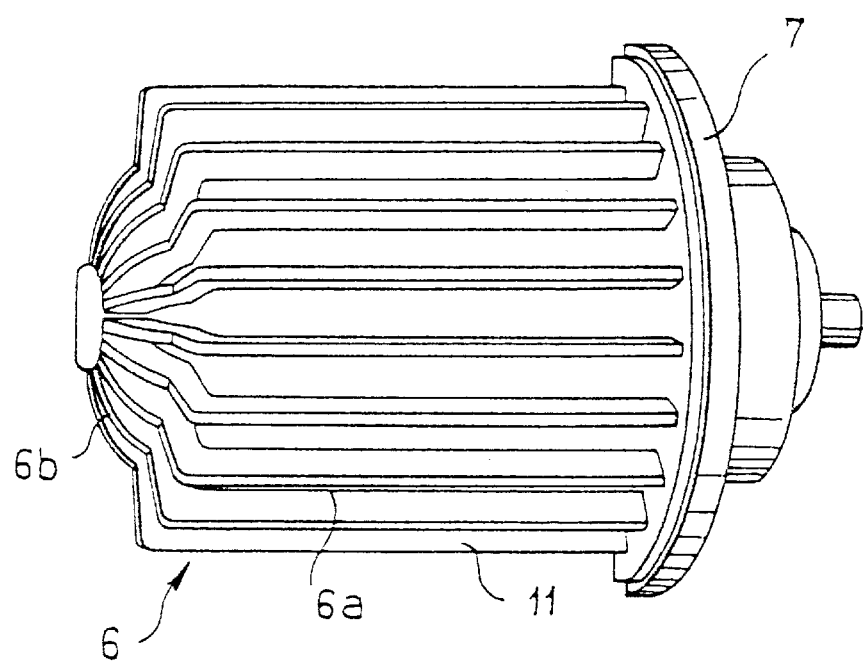
FIG. 5 is a perspective view of the production method of FIG. 4.

These two pieces can have different thicknesses as a result of the applications designed. Specifically, as is illustrated in FIGS. 4 and 5, the piece 7 can be made up of one simple closing plate on which comes to relate to the hollow part 6.

Also, the plate carries charcoal (not represented in FIGS. 2 to 5) can be placed on the interior of the frame 1 on the bottom 7b of the piece 7. The heat freed by the plate 7 is also directly removed by the plate 7.

The shaft 3 has an end fitted in order to allow the creation of the input element of the actuator. For example, as is illustrated in a schematic manner on FIG. 4, the shaft 3 has a threaded end 33 in order to guide a nut or a wheel belonging to a engaging device, such as is described in documents EP 0 740 401 and EP 0 897 629.

However, in order to obtain thermal changes even more efficiently between the inductor and the rest of the motor, specifically while the conductor thread is of a bigger diameter so that the motor can furnish a larger couple motor, it is advantageous that the coils and the buns are nearer to the frame. In order to do this, without de-standardizing the notches of the steel packet, the bottoms of the notches are filled with a plastic material, or any other electrically and thermally isolating material, so that the thread coils occupy all of the space in the top of the grooves and thus radiation towards the frame and/or the ring. Variably, it is also possible to produce specific less deep notches.

What is claimed is:

1. An electric motor comprising:
    a rotor provided with a coil having a first end and a second end axially-spaced from the first end, the rotor mounted rotatingly in a hollow frame formed of two parts having respective end walls, the two parts being made of a heat conducting material, and the frame carrying induction means, wherein each of the respective end walls is continuously adjacent to one of the first end and the second end of the coil, and wherein the two parts are directly mounted to each other to form an area of contact perpendicular to a rotational axis of the rotor.

2. The motor according to claim 1 wherein the respective end walls envelope the ends of the coil, the first end and the second end being in the shape of buns.

3. The motor according to claim 2 wherein the respective end walls of the two parts have a central, bowl-shaped portion.

4. The motor according to claim 1 wherein a material of the two parts is non-magnetic.

5. The motor according to claim 4 wherein the material is one of "zamac", aluminum, and magnesium.

6. The motor according to claim 1 wherein a material of the two parts is at least one of a magnetic material and a magnetizable material.

7. The motor according to claim 1 wherein at least one of the two parts of the frame includes elements on an exterior surface that contribute to an increase in thermal exchange with the ambient air.

8. The motor according to claim 7 wherein the at least one of the two parts carries cooling fins.

9. The motor according to claim 7 wherein a portion of the at least one of the two parts carries a fixation lug.

10. The motor according to claim 1 wherein each of the two pieces of the frame includes its respective end wall and a cylindrical portion extending axially toward the area of contact.

11. The motor according to claim 1 wherein each of the two parts has an annular assembly flange forming the area of contact.

12. The motor according to claim 11 wherein at least one of the flanges has at least one fixation lug in a plane parallel to the rotational axis.

13. The motor according to claim 1 wherein one of the two parts of the frame has the form of a closing plate on which the other of the two parts is attached.

14. The motor according to claim 1 wherein the two parts are made of different materials.

15. The motor according to claim 1 wherein the frame is sealed so as to be water- and dust-proof.

16. The motor according to claim 1 wherein one of the two parts has a cylindrical portion extending axially from its respective end wall toward the other of the two parts, the cylindrical portion ending in a radially-extending flange sealingly engaged with an annular portion of the other of the two parts.

17. The motor according to claim 16 wherein the annular portion of the other of the two parts is one of a portion of its respective end wall and a radially-extending flange extending from a cylindrical portion of the other of the two parts.

18. The motor according to claim 16 wherein a plurality of cooling fins extend radially from the cylindrical portion.

19. An electric motor comprising:

a rotor provided with a coil having a first end and a second end axially-spaced from the first end, the rotor mounted rotatingly in a hollow frame formed of two parts having respective end walls, the two parts being made of a heat conducting material, and the frame carrying induction means, wherein each of the respective end walls is continuously adjacent to one of the first end and the second end of the coil, and wherein the two parts are directly mounted to each other to form an area of contact perpendicular to a rotational axis of the rotor, and wherein one of the two parts of the frame includes at least one part of a gear box casing of an actuator driven by the motor.

20. The motor according to claim 19 wherein one of the two parts has a cylindrical portion extending axially from its respective end wall toward the other of the two parts, the cylindrical portion ending in a radially-extending flange sealingly engaged with an annular portion of the other of the two parts.

21. The motor according to claim 20 wherein the annular portion of the other of the two parts is one of a portion of its respective end wall and a radially-extending flange extending from a cylindrical portion of the other of the two parts.

22. The motor according to claim 20 wherein a plurality of cooling fins extend radially from the cylindrical portion.

23. An electric motor comprising:

a rotor provided with a coil having a first end and a second end axially-spaced from the first end, the rotor mounted rotatingly in a hollow frame formed of two parts having respective end walls, the two parts being made of a heat conducting material, and the frame carrying induction means, wherein each of the respective end walls is continuously adjacent to one of the first end and the second end of the coil, and wherein the two parts are directly mounted to each other to form an area of contact perpendicular to a rotational axis of the rotor, and wherein a plate carrying charcoal is placed at the interior of the frame on one of the respective end walls.

24. The motor according to claim 23 wherein one of the two parts has a cylindrical portion extending axially from its respective end wall toward the other of the two parts, the cylindrical portion ending in a radially-extending flange sealingly engaged with an annular portion of the other of the two parts.

25. The motor according to claim 24 wherein the annular portion of the other of the two parts is one of a portion of its respective end wall and a radially-extending flange extending from a cylindrical portion of the other of the two parts.

26. The motor according to claim 24 wherein a plurality of cooling fins extend radially from the cylindrical portion.

* * * * *